(12) United States Patent
Yi et al.

(10) Patent No.: US 11,919,642 B2
(45) Date of Patent: Mar. 5, 2024

(54) LARGE-LOAD UNMANNED AERIAL VEHICLE FOR PLANT PROTECTION WITH ADJUSTABLE SPRAYING SWATH AND PESTICIDE APPLICATION AMOUNT

(71) Applicant: Shandong University of Technology, Zibo (CN)

(72) Inventors: Lili Yi, Zibo (CN); Yubin Lan, Zibo (CN); Xin Han, Zibo (CN); Fanxia Kong, Zibo (CN); Huizheng Wang, Zibo (CN); Guobin Wang, Zibo (CN); Rongxin Zhang, Zibo (CN); Guangyu Yang, Zibo (CN); Lijie Geng, Zibo (CN); Weixu Ran, Zibo (CN)

(73) Assignee: Shandong University of Technology, Zibo (CN)

( * ) Notice: Subject to any disclaimer, the term of this patent is extended or adjusted under 35 U.S.C. 154(b) by 0 days.

(21) Appl. No.: 17/733,896

(22) Filed: Apr. 29, 2022

(65) Prior Publication Data

US 2023/0286651 A1     Sep. 14, 2023

(30) Foreign Application Priority Data

Mar. 11, 2022 (CN) .......................... 202210235130.8

(51) Int. Cl.
| | |
|---|---|
| *B64U 10/13* | (2023.01) |
| *B64D 1/18* | (2006.01) |
| *B64C 39/02* | (2023.01) |
| *B64U 101/00* | (2023.01) |
| *B64U 101/45* | (2023.01) |

(52) U.S. Cl.
CPC .............. *B64D 1/18* (2013.01); *B64C 39/024* (2013.01); *B64U 10/13* (2023.01); *B64U 2101/00* (2023.01); *B64U 2101/45* (2023.01)

(58) Field of Classification Search
CPC .............................. B64D 1/18; B64U 2101/45
See application file for complete search history.

(56) References Cited

U.S. PATENT DOCUMENTS

| | | | | |
|---|---|---|---|---|
| 2018/0093284 | A1* | 4/2018 | Harris | ..................... B05B 9/007 |
| 2018/0319500 | A1* | 11/2018 | Grimm | ..................... B64D 1/18 |
| 2019/0009907 | A1* | 1/2019 | Wu | ......................... A01G 25/00 |
| 2020/0260714 | A1* | 8/2020 | Pleatman | ............ A01M 7/0085 |

(Continued)

*Primary Examiner* — Jessica B Wong
(74) *Attorney, Agent, or Firm* — Howard IP Law Group

(57) ABSTRACT

A large-load unmanned aerial vehicle (UAV) for plant protection with adjustable spraying swath and pesticide application amount is provided, relating to the technical field of pesticide application of unmanned aerial vehicles. The large-load unmanned aerial vehicle for plant protection comprises a large-load unmanned aerial vehicle, a pesticide box, a variable pesticide application system, and adjustable spraying swath mechanisms, wherein the pesticide box is fixed to landing gears of the unmanned aerial vehicle and is positioned below a control platform of the unmanned aerial vehicle; the adjustable spraying swath mechanisms are arranged on the landing gears, the variable pesticide application system is connected with the pesticide box and the adjustable spraying swath mechanisms, the variable pesticide application system and the adjustable spraying swath mechanisms are electrically connected with the control platform, and the control platform is in communication connection with a remote control handle.

7 Claims, 4 Drawing Sheets

(56) References Cited

U.S. PATENT DOCUMENTS

| | | |
|---|---|---|
| 2021/0078706 A1* | 3/2021 | Lin ........................ G06V 20/17 |
| 2021/0283639 A1* | 9/2021 | Zvara .................... B64C 39/024 |
| 2021/0339294 A1* | 11/2021 | Melanson ................. A61L 2/03 |
| 2021/0379617 A1* | 12/2021 | Chapple ................... B64D 1/18 |
| 2022/0073205 A1* | 3/2022 | Hertzberg ................ B64D 1/18 |
| 2022/0111960 A1* | 4/2022 | Tran ....................... B64U 10/13 |
| 2022/0153417 A1* | 5/2022 | Faers .................... B64C 39/024 |
| 2022/0250749 A1* | 8/2022 | Kominami ................ B05B 9/04 |
| 2022/0355928 A1* | 11/2022 | Lee ....................... B64U 10/60 |
| 2022/0411055 A1* | 12/2022 | Kominami ............. B05B 15/68 |
| 2023/0021314 A1* | 1/2023 | Kominami ............. B64C 25/06 |
| 2023/0025073 A1* | 1/2023 | Kominami ............. B64U 20/30 |
| 2023/0027548 A1* | 1/2023 | Kominami ............. B05B 15/62 |

\* cited by examiner ing Z-shaped arm.
LARGE-LOAD UNMANNED AERIAL VEHICLE FOR PLANT PROTECTION WITH ADJUSTABLE SPRAYING SWATH AND PESTICIDE APPLICATION AMOUNT

CROSS REFERENCE TO RELATED APPLICATION

This patent application claims the benefit and priority of Chinese Patent Application No. 202210235130.8 filed on Mar. 11, 2022, the disclosure of which is incorporated by reference herein in its entirety as part of the present application.

TECHNICAL FIELD

The present disclosure relates to the technical field of unmanned aerial vehicles for plant protection, and in particular relates to a large-load unmanned aerial vehicle for plant protection with adjustable spraying swath and pesticide application amount.

BACKGROUND ART

With the continuous development of precision agriculture technology, the application of unmanned aerial vehicle for plant protection is becoming more and more widespread. However, domestically, most of the crops are not planted in a standard pattern (i.e., planting spacing is set according to standard plant protection machinery) at present, thus the operator of unmanned aerial vehicle needs to adjust the spraying swath according to different planting patterns. When operating in orchards in non-standard planting patterns, frequent manual adjustment of spraying swath is required to ensure the uniformity of aerial spraying droplets, which not only reduces operational efficiency, but also brings risks to the operation of unmanned aerial vehicle. When an existing unmanned aerial vehicle for plant protection is used for plant protection operation, the pesticide application amount cannot be adjusted in real time, which means that the spatial difference of plant diseases and insect pests in a field parcel is ignored, resulting in excessive pesticide consumption in some regions, and the purpose of controlling plant diseases and insect pests with reduced amount of pesticide is not achieved.

SUMMARY

The present disclosure aims to provide a large-load unmanned aerial vehicle for plant protection with adjustable spraying swath and pesticide application amount to solve the above problem existing in the prior art, wherein the spraying swath and pesticide application amount of a spray rod of an unmanned aerial vehicle for plant protection can be adjustable and the operation can be convenient.

To achieve the objective, the present disclosure provides the following solutions:

A large-load unmanned aerial vehicle for plant protection with adjustable spraying swath and pesticide application amount comprises a large-load unmanned aerial vehicle, a pesticide box, a variable pesticide application system, and adjustable spraying swath mechanisms, wherein the pesticide box is fixed to landing gears of the unmanned aerial vehicle and is positioned below a control platform of the unmanned aerial vehicle; the adjustable spraying swath mechanisms are arranged on the landing gears, the variable pesticide application system is connected with the pesticide box and the adjustable spraying swath mechanisms, the variable pesticide application system and the adjustable spraying swath mechanisms are electrically connected with the control platform, and the control platform is in communication connection with a remote control handle.

Preferably, each of four corners of a carrying platform of the unmanned aerial vehicle is connected with a flight propeller above the carrying platform through an upwardly inclined Z-shaped arm.

Preferably, the flight propeller is a coaxial dual-propeller type flight propeller.

Preferably, the adjustable spraying swath mechanisms are symmetrically arranged on the landing gears at two sides of the unmanned aerial vehicle, each of the adjustable spraying swath mechanisms including a spray rod and a rotating mechanism, wherein the spray rod is connected to a landing gear through the rotating mechanism.

Preferably, the rotating mechanism comprises a steering engine, a rocker, and a connecting rod; an end of the spray rod is hinged to a cross bar of the landing gear, one end of the rocker is connected to the steering engine, another end of the rocker is hinged to one end of the connecting rod, another end of the connecting rod is hinged to the end of the spray rod, and the steering engine is fixedly connected to the cross bar of the landing gear.

Preferably, at least two spray rods are provided, and adjacent spray rods are connected through a foldable element.

Preferably, the foldable element comprises a first pipe hoop and a second pipe hoop, the first pipe hoop and the second pipe hoop are respectively fixed to the end of one spray rod, one end of the first pipe hoop is hinged to one end of the second pipe hoop, and another end of the first pipe hoop and another end of the second pipe hoop are connected by bolts after being abutted to each other.

Preferably, the variable pesticide application system comprises an image recognition system, a pump, a pesticide conveying pipe, and a nozzle; the image recognition system is arranged in front of the unmanned aerial vehicle, the pump is arranged in the pesticide box and is connected to the nozzle through the pesticide conveying pipe, the pesticide conveying pipe is fixed to the spray rod, the nozzle is movably arranged on the spray rod, and the image recognition system and the pump are electrically connected with the control platform, respectively.

Preferably, the spray rod is sleeved with the nozzle through a pipe hoop, interfaces of the pipe hoop are connected through a bolt, the nozzle is a pressure nozzle, and the pump is a brushless pump.

Compared with the prior art, the present disclosure has the following technical effects:

the variable pesticide application system and the adjustable spraying swath mechanisms can increase pesticide application amount to a region with severe plant diseases and insect pests damage under the condition that the spray rate is unchanged, and regional variable spraying under different planting modes can be achieved through the adjustable spraying swath mechanisms, thus solving the problems that an existing UAV for plant protection is unchangeable in pesticide spraying amount, fixed and non-adjustable in spraying swath range, and poor in variable spraying effect.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
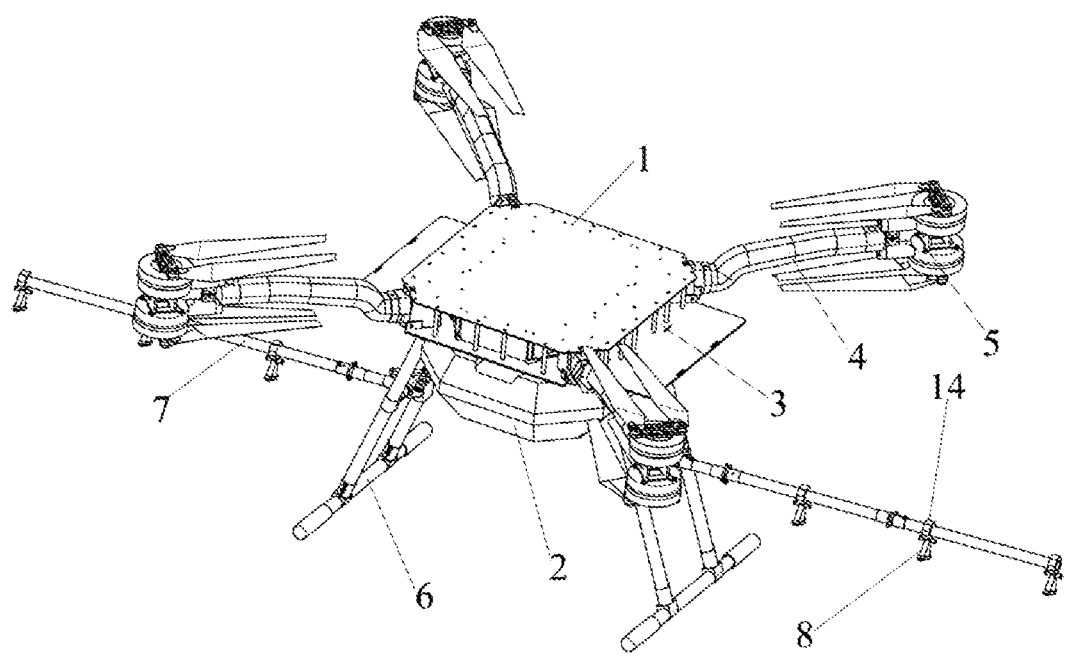
FIG. 1 is a first structure diagram of a large-load unmanned aerial vehicle for plant protection with adjustable spraying swath and pesticide application amount of the present disclosure.
Figure 2:
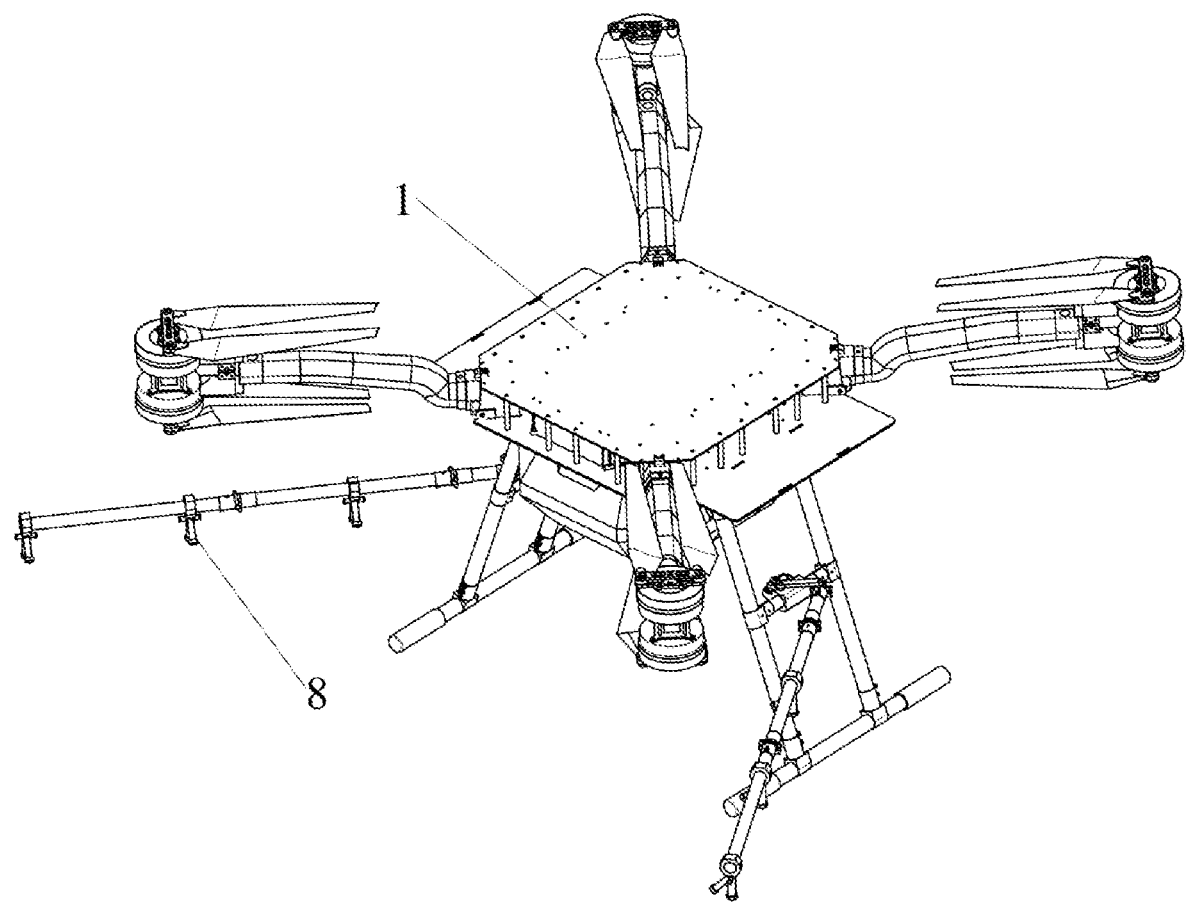
FIG. 2 is a second structure diagram of a large-load unmanned aerial vehicle for plant protection with adjustable spraying swath and pesticide application amount of the present disclosure.

In the drawings: 1—unmanned aerial vehicle, 2—pesticide box, 3—control platform, 4—Z-shaped arm, 5—coaxial dual-propeller type flight propeller, 6—landing gear, 7—spray rod, 8—nozzle, 9—steering engine, 10—rocker, 11—connecting rod, 12—first pipe hoop, 13—second pipe hoop, 14—pipe hoop, 15—bolt.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a large-load unmanned aerial vehicle for plant protection with adjustable spraying swath and pesticide application amount to solve the problem existing in the prior art, thus making the spraying swath and pesticide application amount of a spray rod of a unmanned aerial vehicle for plant protection adjustable and the operation convenient.

To make the objective, features and advantages of the present disclosure more understandable, the following further describes the present disclosure in detail with reference to the accompanying drawings and specific embodiments.

As shown from FIG. 1 to FIG. 4, a large-load unmanned aerial vehicle for plant protection with adjustable spraying swath and pesticide application amount, comprising a large-load unmanned aerial vehicle 1, a pesticide box 2, a variable pesticide application system, and adjustable spraying swath mechanisms, wherein the pesticide box 2 is fixed to landing gears 6 of the unmanned aerial vehicle 1 and is positioned below a control platform 3 of the unmanned aerial vehicle 1; the adjustable spraying swath mechanisms are arranged on the landing gears 6, the variable pesticide application system is connected with the pesticide box 2 and the adjustable spraying swath mechanisms, the variable pesticide application system and the adjustable spraying mechanisms are electrically connected with the control platform 3, and the control platform 3 is in communication connection with a remote control handle.

Each of four corners of a carrying platform of the unmanned aerial vehicle 1 is connected with a flight propeller above the carrying platform through an upwardly inclined Z-shaped arm 4, wherein the flight propeller is a coaxial dual-propeller type flight propeller 5. The unmanned aerial vehicle 1 of the embodiment is a coaxial dual-propeller unmanned aerial vehicle having totally eight rotors, which can adapt to larger loads according to the load requirements of a mission; furthermore, the Z-shaped arm 4 can lower the center of gravity of the main load, thus making the flight process of the unmanned aerial vehicle 1 with pesticide more smoother.

The control platform 3 of the unmanned aerial vehicle 1 of the embodiment is installed in a control cabin, a main body of the control cabin consists of two carbon plates made of carbon fiber materials, a connecting hole is provided in each carbon plate, and the upper carbon plate and the lower carbon plate are connected to the periphery of the control cabin through copper columns. To prevent splashing of sprayed pesticide liquid and the fine dust particles from damaging the system components in the control platform 3, an aluminum alloy baffle is designed on the outer surface (the inner sides of the copper columns) of the control platform 3, the aluminum alloy baffle has a certain thickness, and threaded holes are tapped in an upper plane and a lower plane of the baffle, i.e., the copper columns and the aluminum alloy baffle are connected to the upper carbon plate and the lower carbon plate through screws. By adopting the copper columns, the flight mass of the unmanned aerial vehicle is reduced, and the rigidity of the whole unmanned aerial vehicle is improved. Wherein a power system of the unmanned aerial vehicle 1 comprises a motor, blades, an electronic speed controller, and a high-voltage lithium battery all of which can be upgraded and optimized according to load requirements of a mission.

Figure 3:
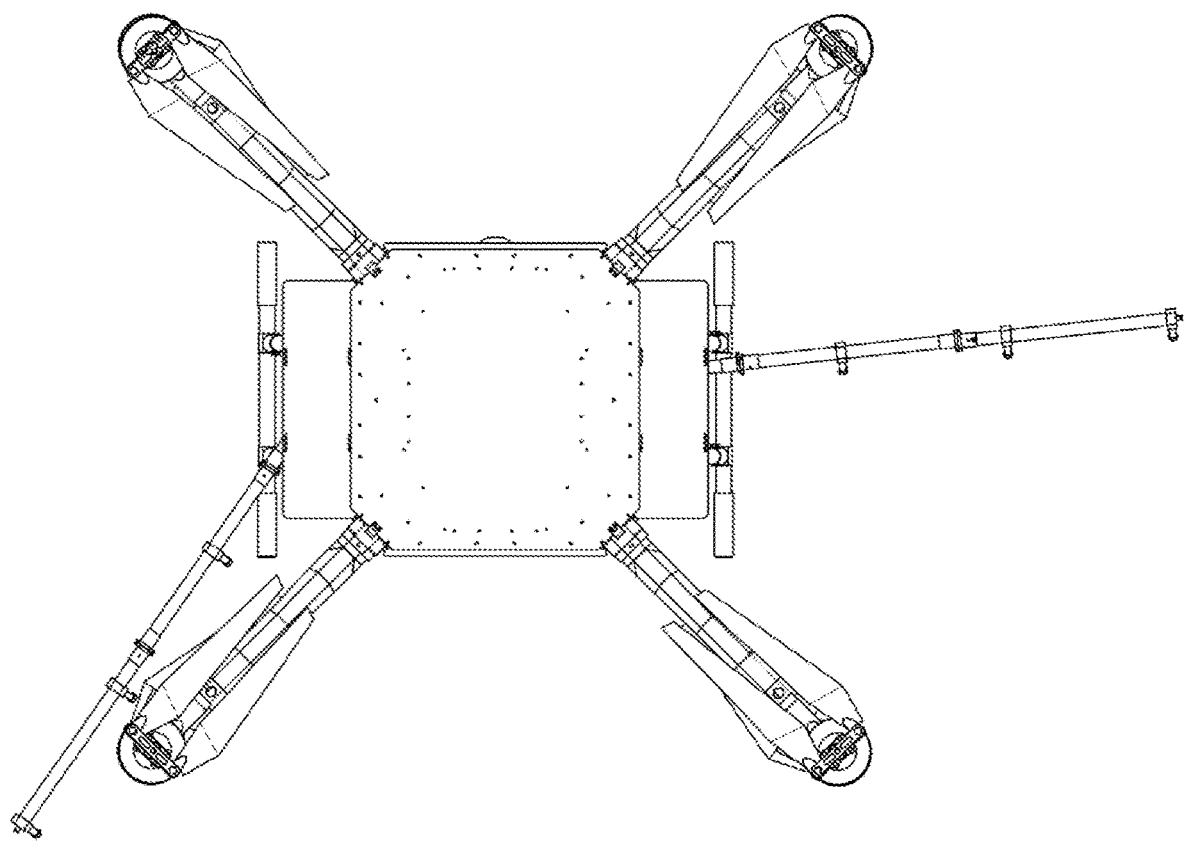
FIG. 3 is a third structure diagram of a large-load unmanned aerial vehicle for plant protection with adjustable spraying swath and pesticide application amount of the present disclosure.
Figure 4:
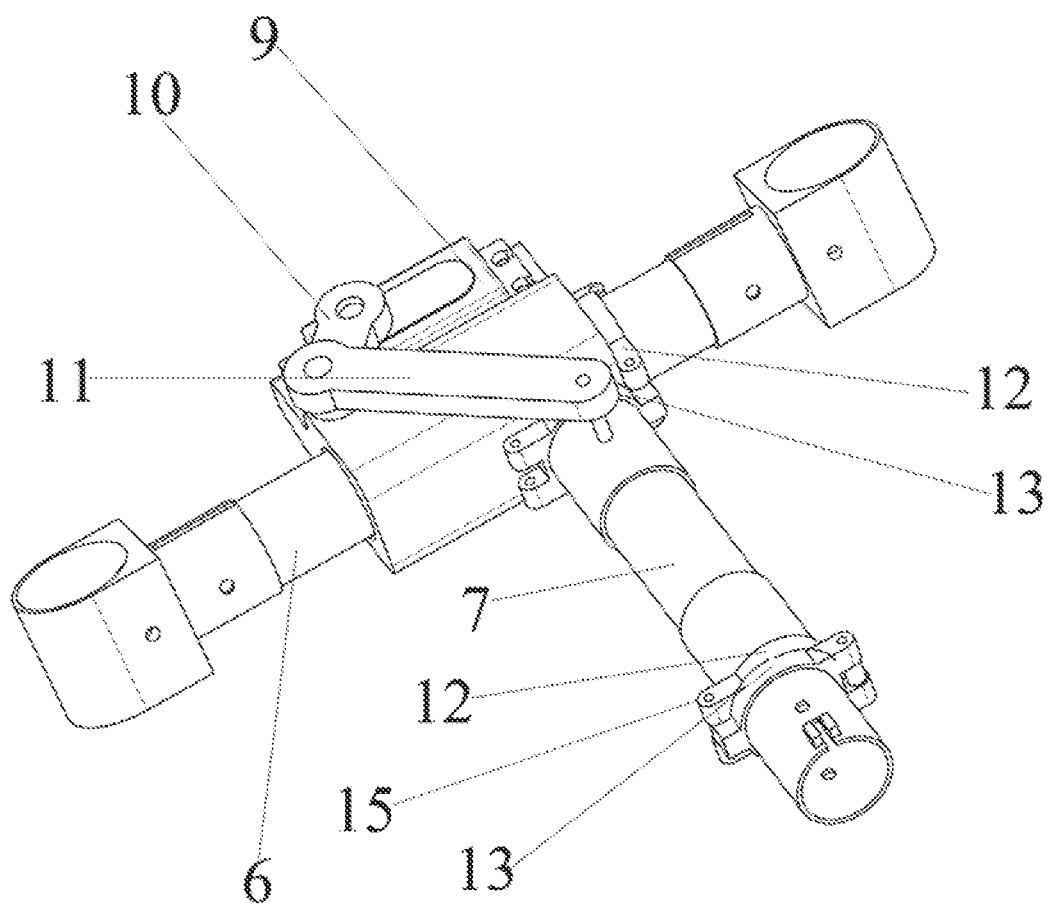
FIG. 4 is a structure diagram of an adjustable spraying swath mechanism in the present disclosure.

The adjustable spraying swath mechanisms are symmetrically arranged on the landing gears 6 at two sides of the unmanned aerial vehicle 1, each of the adjustable spraying swath mechanisms including a spray rod 7 and a rotating mechanism, wherein the spraying rod 7 is connected to a landing gear 6 through the rotating mechanism. The rotating mechanism comprises a steering engine 9, a rocker 10, and a connecting rod 11, the end of the spray rod 7 is hinged to a cross bar of the landing gear 6, one end of the rocker 10 is connected to the steering engine 9, other end of the rocker is hinged to one end of the connecting rod 11, the other end of the connecting rod 11 is hinged to the end of the spray rod 7, and the steering engine 9 is fixedly connected to the cross bar of the landing gear 6. The spray rods 7 of the embodiment are driven by a crankshaft connecting rod mechanism to fold towards the middle (to reduce an angle between the two spray rods 7), the spraying swath variable adjustment of the pesticide application amount is changed through the change of the angle between the spray rods 7 under the condition that the spray rate is unchanged; and the angles of the spray rods 7 can be changed at any time according to crop regions, and the angles of the spray rods 7 at the two sides can be inconsistent, as shown in FIG. 3.

At least two spray rods 7 are provided, and the adjacent spray rods 7 are connected through a foldable element, wherein the foldable element comprises a first pipe hoop 12 and a second pipe hoop 13, the first pipe hoop 12 and the second pipe hoop 13 are respectively fixed to the end of one spray rod 7, one end of the first pipe hoop 12 is hinged to one end of the second pipe hoop 13, and another end of the first pipe hoop and another end of the second pipe hoop are connected by bolts 15 after being abutted to each other, thus the spray rods 7 can be folded during transportation of the unmanned aerial vehicle 1 to facilitate the transportation in the process.

The variable pesticide application system comprises an image recognition system, a pump, a pesticide conveying pipe, and a nozzle 8, wherein the image recognition system is arranged in front of the unmanned aerial vehicle 1, the pump is arranged in the pesticide box 2, the pump is connected to the nozzle 8 through the pesticide conveying pipe, the pesticide conveying pipe is fixed to the spray rod 7, the nozzle 8 is movably arranged on the spray rod 7, the image recognition system and the pump are electrically connected with the control platform 3, respectively; and the nozzle 8 is a pressure nozzle, the pump is a brushless pump, which is convenient for adjusting. The spray rod 7 is sleeved with the nozzle 8 through a pipe hoop 14, and interfaces of the pipe hoop 14 are connected through a bolt, thus the operations of dismounting the nozzle and adjusting the spacing between the nozzle 8 are convenient; the spacing distance between the pressure nozzles can be adjusted prior to the spraying operation to ensure that droplets are in a lower rotor wind field generated by the unmanned aerial vehicle, thus preventing a pesticide-free region from occurring. The pesticide conveying pipes are fixed onto the foldable spray rods 7 at two sides through binding belts, personnel for spraying operation can increase the spray rate of the nozzle 8 by increasing the water pumping rate of the pump to increase pesticide application amount of the region with severe plant diseases and insect pests, thus achieving the purpose of variable spraying.

The whole working process of the large-load unmanned aerial vehicle (UAV) for plant protection with adjustable spraying swath and pesticide application amount of the embodiment is as follows: the personnel for spraying operation controls the unmanned aerial vehicle 1 to fly to the space above to-be-sprayed crops through a remote control terminal to start pesticide spraying, the pump is firstly controlled to send a water pumping signal, the water pumping rate of a water pump is controlled to reach a required stable value, and then the nozzle 8 begins to spray pesticide liquid; the unmanned aerial vehicle 1 for plant protection flies according to a planned route, and personnel for spraying operation in the distance judges the plant diseases and insect pests degree of the crops through a crop disease prescription chart returned by the image recognition system of the unmanned aerial vehicle 1 in real time; on one hand, the personnel for spraying operation can transmit PWM signals through 2.5 G and the like by driving the steering engine 9, and then the spray rods 7 at the two sides of the unmanned aerial vehicle 1 for plant protection are folded towards the middle (the angle between the two foldable spray rods 7 is reduced), a crank rocker is controlled to swing and rotate periodically, thus increasing the pesticide application amount in the region with severe plant diseases and insect pests under the condition that the spray rate is unchanged, and achieving regional variable spraying through the structural design of the foldable spray rods 7; on the other hand, the personnel for spraying operation can accelerate the spray rate of the pressure nozzle by adjusting the water pumping rate of the water pump, thus achieving the purpose of variable spraying; and the purpose of the variable spraying of the unmanned aerial vehicle 1 is achieved through macroscopic structure control and microscopic flow velocity control.

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An unmanned aerial vehicle for plant protection with adjustable spraying swath and pesticide application amount, comprising:
   a pesticide box;
   a variable pesticide application system;
   adjustable spraying swath mechanisms;
   wherein the pesticide box is fixed to landing gears of the unmanned aerial vehicle and is positioned below a control platform of the unmanned aerial vehicle;
   wherein the adjustable spraying swath mechanisms are arranged on the landing gears;
   wherein the variable pesticide application system is connected with the pesticide box and the adjustable spraying swath mechanisms, the variable pesticide application system and the adjustable spraying swath mechanisms are electrically connected with the control platform, and the control platform is in communication connection with a remote control handle;
   wherein the adjustable spraying swath mechanisms are symmetrically arranged on the landing gears at two sides of the unmanned aerial vehicle, each of the adjustable spraying swath mechanisms including a spray rod and a rotating mechanism, wherein the spray rod is connected to a landing gear through the rotating mechanism; and
   wherein the rotating mechanism comprises a steering engine, a rocker and a connecting rod; an end of the spray rod is hinged to a cross bar of the landing gear, one end of the rocker is connected to the steering engine, another end of the rocker is hinged to one end of the connecting rod, another end of the connecting rod is hinged to the end of the spray rod, and the steering engine is fixedly connected to the cross bar of the landing gear.

2. The unmanned aerial vehicle according to claim 1, wherein each of four corners of a carrying platform of the unmanned aerial vehicle is connected with a flight propeller above the carrying platform through an upwardly inclined Z-shaped arm.

3. The unmanned aerial vehicle according to claim 2, wherein the flight propeller is a coaxial dual-propeller type flight propeller.

4. The unmanned aerial vehicle according to claim 1, wherein at least two spray rods are provided, and adjacent spray rods are connected through a foldable element.

5. The unmanned aerial vehicle according to claim 4, wherein the foldable element comprises a first pipe hoop and a second pipe hoop, the first pipe hoop and the second pipe hoop are respectively fixed to the end of one spray rod, one end of the first pipe hoop is hinged to one end of the second pipe hoop, and another end of the first pipe hoop and another end of the second pipe hoop are connected by bolts after being abutted to each other.

6. The unmanned aerial vehicle according to claim 1, wherein the variable pesticide application system comprises an image recognition system, a pump, a pesticide conveying pipe, and a nozzle; the image recognition system is arranged in front of the unmanned aerial vehicle, the pump is arranged in the pesticide box and is connected to the nozzle through the pesticide conveying pipe, the pesticide conveying pipe is fixed to the spray rod, the nozzle is removably and adjustably arranged on the spray rod, and the image recognition system and the pump are electrically connected with the control platform, respectively.

7. The unmanned aerial vehicle according to claim 6, wherein the spray rod is sleeved with the nozzle through a pipe hoop, interfaces of the pipe hoop are connected through a bolt, the nozzle is a pressure nozzle, and the pump is a brushless pump.

\* \* \* \* \*